United States Patent [19]
O'Meara

[11] 3,975,629
[45] Aug. 17, 1976

[54] ADAPTIVE IMAGING TELESCOPE WITH LINEAR SENSING AND ELECTRO-OPTICAL PHASE SHIFTING

[75] Inventor: Thomas R. O'Meara, Malibu, Calif.

[73] Assignee: Hughes Aircraft Company, Culver City, Calif.

[22] Filed: June 24, 1974

[21] Appl. No.: 482,185

[52] U.S. Cl. .............................. 250/201; 350/160 R
[51] Int. Cl.² ........................................... G01J 1/20
[58] Field of Search ............ 250/201, 202, 203, 578; 350/160, 162 R, 162 SF, 17, 205; 178/DIG. 25; 331/94.5

[56] References Cited
UNITED STATES PATENTS

| | | | |
|---|---|---|---|
| 3,431,504 | 3/1969 | Adler | 350/162 R |
| 3,594,660 | 7/1971 | Huggett | 350/160 R |
| 3,705,758 | 12/1972 | Haskal | 350/160 R |
| 3,713,042 | 1/1973 | Kinsel | 350/160 R |
| 3,731,103 | 5/1973 | O'Meara | 250/199 |
| 3,749,475 | 7/1973 | Shupe | 350/162 SF |
| 3,846,628 | 11/1974 | Towne | 250/201 |

*Primary Examiner*—David C. Nelms
*Attorney, Agent, or Firm*—Martin E. Gerry; W. H. MacAllister

[57] ABSTRACT

An adaptive imaging telescope having a linear sensor for detecting a received optical image. The system includes a choice of two electro-optic phase shifters positioned substantially at the aperture of the telescope responsive to the received optical image. The linear sensor may consist either of a pinhole detector, a transform circuit such as of the Fourier type, or a video camera with computation circuits. This system also includes circuits responsive to outputs from the linear sensor feeding the phase shifter in closed-loop arrangement.

17 Claims, 11 Drawing Figures

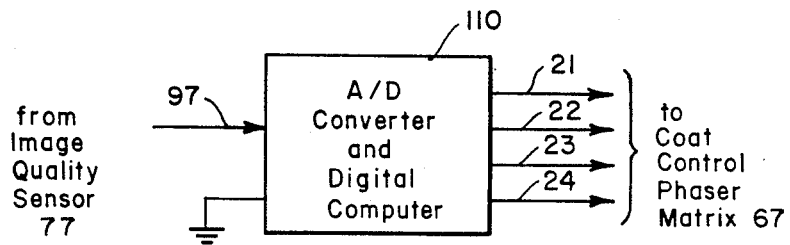
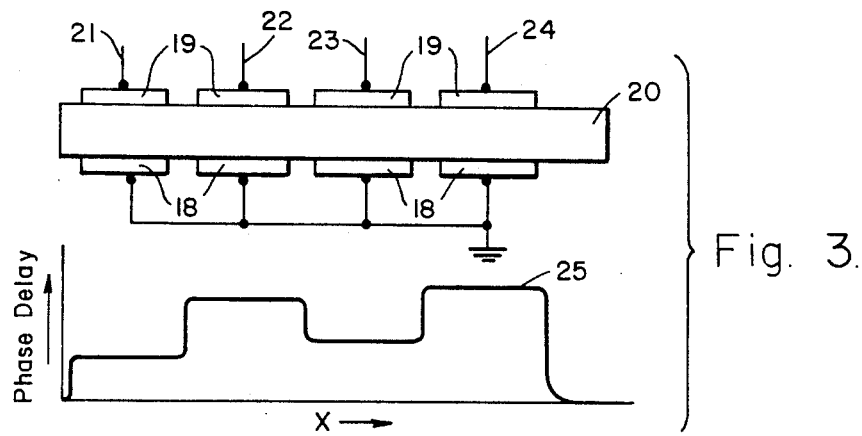
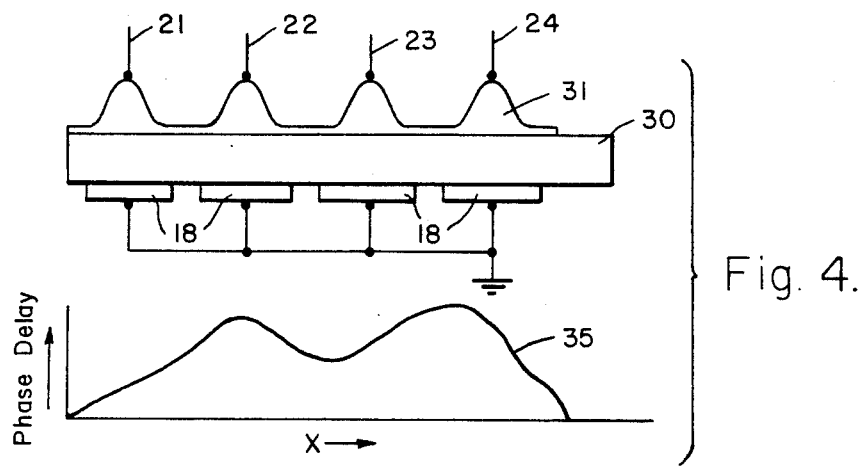

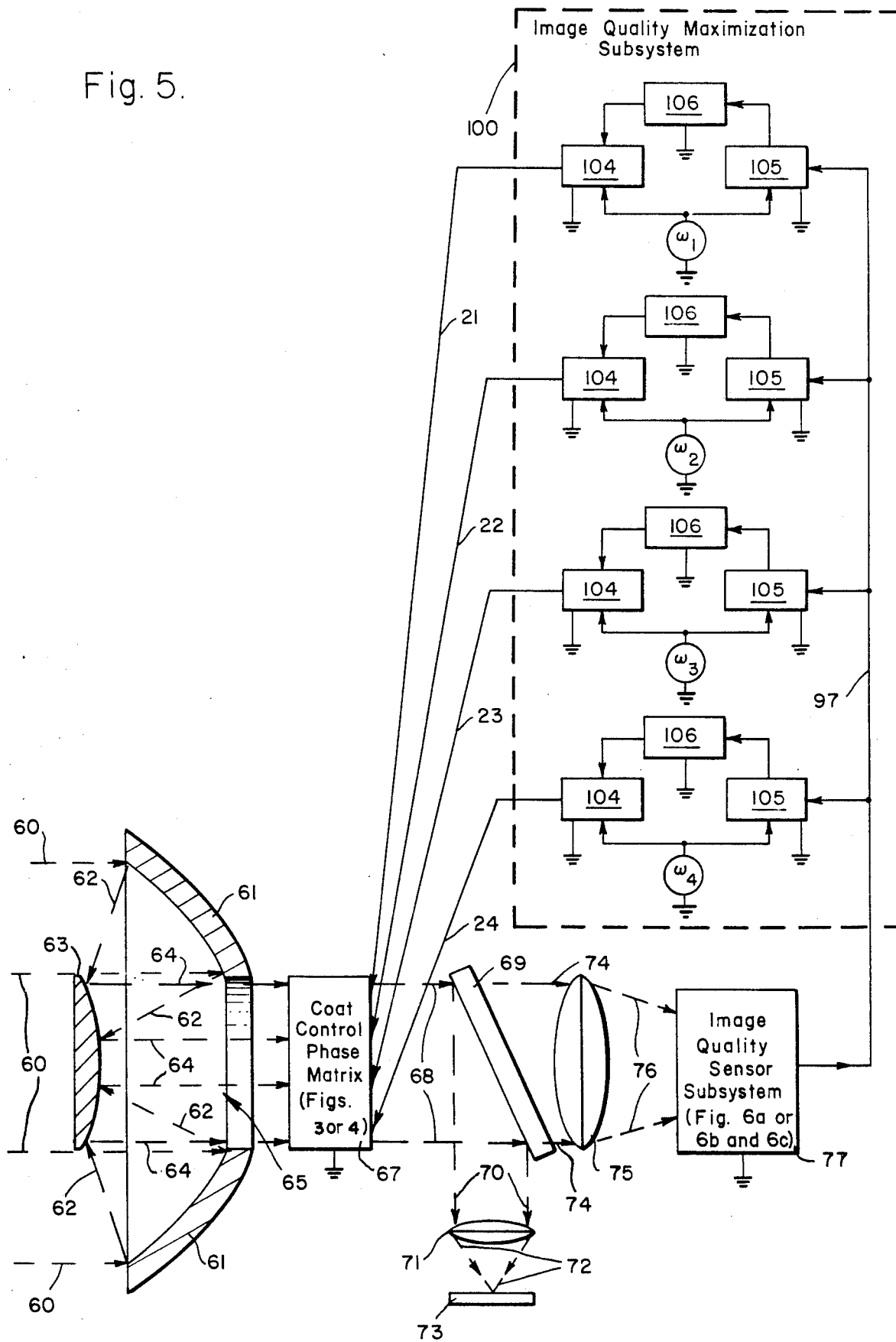

ADAPTIVE IMAGING TELESCOPE WITH LINEAR SENSING AND ELECTRO-OPTICAL PHASE SHIFTING

CROSS-REFERENCE TO RELATED COPENDING APPLICATIONS

Applications, Ser. Nos. 482,175; 482,186; 482,187; and 482,188 were all filed June 24, 1974, concurrent with this application.

BACKGROUND OF THE INVENTION

This invention is in the field of adaptive imaging telescopes, and in particular such telescopes that compensate images viewed through atmospheric turbulence.

The atmosphere has a substantially uniform effect on a portion of a wavefront impinging on a small aperture, say 4 inches or less in diameter, at visible wavelengths. The impinged wavefronts can be decomposed into phase effects, and amplitude or scintillation effects. The phase effects are of major importance causing nearly a spatially uniform but time-varying random advance or retardation of the wavefront which can easily be as large as several times $2\pi$ radians.

In large telescopes which may be considered as compounded telescopes due to superposition of the above small apertures, the first effect mentioned is overwhelmingly troublesome. More specifically, with a point image, the subapertures may be paired, and it may be shown that each pair of subapertures generates its own characteristic Fourier component fringe pattern in the image plane. In the distortionless propagation case, all of these fringe patterns add constructively at the image center and effectively add more and more destructively at positions in the image plane progressively removed from the center. Since the first mentioned effect can change either the position of the fringes or the phases of the optical carrier, which is sptially modulated by them, it can readily happen that the desired constructive interference on axis, and destructive interference off axis, is not obtained. Consequently, peak image intensity is reduced and the image is not narrowed by the superposition of fringe patterns, or at least it is not narrowed to the full potential of the system. Thus, images are smeared out by these atmospheric effects and imaging through long atmospheric paths with apertures exceeding 4 inches is usually limited by this phenomenon rather than by the optics of the imaging system.

Prior art systems have employed several restoration schemes. Some classificational schemes are post-film-recording or restoration systems, and pre-film-recording or pre-correction systems. By far, the largest number of schemes have been of the post-film-recording category and, as one conseqeunce, have not been real-time systems. Of the pre-film-recording techniques, holographic methods have been the most widely explored, and again these have not been in real time. Many suggested techniques, including holography have required a reference, that is a known, ideally a small source, to one side of the unknown source object. In most practical cases an ideal reference natural source is simply not available.

SUMMARY OF THE INVENTION

It is, therefore, an object of the instant invention to reduce the image smearing results by introducing corrective phase control across the receiving aperture which effectively restores the desired fringe superposition, and hence the clarity of the resultant image.

Another object of the instant invention is to eliminate the need for an adjacent reference source, nor a priori, make assumptions that symmetrical source distributions exist in the assumed source.

A further object is to provide a real-time operative system. That is, image corrections in the instant system must be accomplished within $10^{-2}$ seconds, since the atmosphere may substantially change in a period not much greater than this time period.

A still further object is to provide a system fully compatible with post-film-recording restoration techniques, which when combined with the instant invention extend thereto an additional benefit.

It is a yet further object to provide a system having some drift freedom without any particular lock-point in the image plane.

Accordingly, the instant invention employs separate subaperture phase shifters to introduce equal and opposite (time-varying) phase shifts across each aperture in such a way as to compensate the atmospheric shifts. For example, in astronomical imaging the image is to be made as bright and sharp as possible. To achieve this purpose, we need a single measure of the image contrast or sharpness and also we require a technique for maximizing it with respect to the control variables, such as the phase delay applied to the waves as received at each subaperture.

Two measures of image quality or contrast may advantageously be employed. The first measure of contrast is best understood by the one-dimensional image point intensity distributions. The object to be imaged is assumed to include an isolated glint or highlight in its reflectivity distribution which, in the absence of optical distortion, produces a high quality point image. In the uncompensated condition, the point image is spread and, most probably overlapped from images from adjacent glints or highlights. The associated measure of image sharpness is the amount of photon flux which passes through a pinhole of dimensions somewhat less than the dimensions of the high quality point image. The net transmitted flux is much greater for the undistorted or atmospherically compensated case and thus provides a valid measure of image quality.

The second measure of contrast is the relative high-to-low spatial frequency content in the image of an object which contains an intensity or reflectivity distribution which is a sinusoidal function of dimensional extent. Without distortion from atmospheric turbulence or the like, this spatial frequency distribution is retained in the image. Whereas with it the spatial modulation in the image is effectively reduced to nearly zero. The operation of the phase or path length correction system in the present invention is to substantially restore the image to the undistorted condition. The transform of the constant background provides a low frequency term. The transform of a cosinusoidal modulation provides two substantial outer lobes requisite for a high quality image.

In general it will be recognized that the loss in spatial modulation will be a function of the spatial modulation frequency itself and that further there is some loss from the aperture limitation of the telescope itself even without propagation distortions. It will be noted that the higher spatial frequencies which contain the essence of the image detail are virtually eliminated by the atmospheric distortion while the lower spatial frequencies are but little affected. Accordingly, the ratio of high to low spatial frequency content is an appropriate measure of image quality. Further it is a measure which is independent of the absolute brightness of the source.

The detected outputs from either of these image quality sensors then provides error signals for driving the optical phase shifters in such a way that the image quality is maximized. More particularly, in order to achieve this maximization, these phase controls may be dithered at distinctive sinusoidal rates, with separate synchronous detection of each of the induced amplitude components in the image quality sensor output.

BRIEF DESCRIPTION OF THE DRAWINGS

FIG. 3 is an elevation view of an electro-optical phase shifter and its corresponding response curve of phase delay as a function of discrete step phase variation.

FIG. 4 is an elevation view of a continuous surface electro-optical phase shifter and its corresponding response curve of phase delay usable in lieu of the phase shifter of FIG. 3 and providing smooth phase variation with respect to distance.

FIG. 5 is an optical-electrical system schematic of the adaptive imaging telescope illustrating the combination of error sensing means and wavefront error correcting means, in accordance with this invention.

FIG. 7 shows alternate digital computer usage in the instant system in lieu of analog circuitry used therein.

DETAILED DESCRIPTION

Figure 1A:
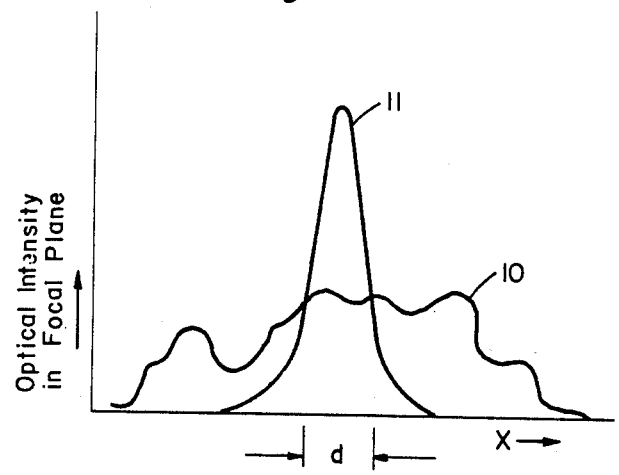
FIGS. 1a and 1b are response curves of the optical intensity distortion in the image plane ahead of and behind the pinhole sensor showing improvement in the image quality in accordance with the invention.
Figure 1B:
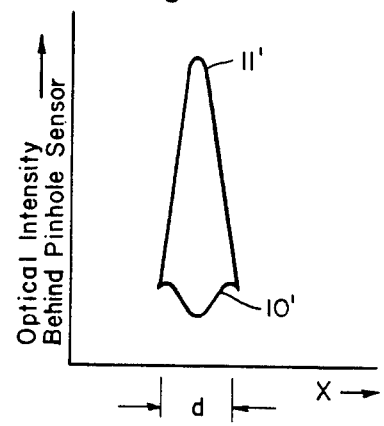

Referring to FIGS. 1a and 1b the object to be imaged is assumed to include an isolated glint or highlight in its reflectivity distribution, wherein the optical intensity in the focal plane of such distribution is shown at 10, resulting from an atmospherically distorted image. On the other hand, optical distortion is compensated for by the instant system so as to provide an optical intensity response in the focal plane of such distribution along the X ordinate (and similarly along the Y ordinate, not shown), as represented by curve 11.

Two measures of image quality or contrast may advantageously be employed. The first measure of contrast is best understood by the one-dimensional image point intensity distributions. The object to be imaged is assumed to include an isolated glint or highlight in its reflectivity distribution, which, in the absence of optical distortion, produces a high quality image as represented by curve 11. In the uncompensated condition the image is spread, and most probably overlapped by images from adjacent glints or highlights, as represented by intensity curve 10. The associated measure of image sharpness is the amount of photon flux which passes through a pinhole of dimensions somewhat less than the dimensions of the high quality point image, as at 11.

In the uncompensated condition of curve 10 the image is spread and, most probably overlapped by images from adjacent glints or highlights, as illustrated by the intensity distribution curve 10. The associated measure of image sharpness is the amount of photon flux which passes through a pinhole as at $d$ of dimensions somewhat less than the dimensions of the high quality image as represented by distortion in curve 11. The distribution curves 10 and 11 are therefore responses as received at the image focal plane prior to the optical beam passing through pinhole $d$. Hence, the net optical flux is seen to be much greater by virtue of the area of curve 11 which is the undistributed or atmospherically compensated case, as compared to the uncompensated case represented by curve 10, and thus provides a valid measure of image quality. The image intensity which transits hole $d$ is shown in FIG. 1b.

Upon passing through pinhole $d$, it may be seen that curve 10 distribution results in distribution 10', whereas curve 11 distribution results in distribution 11'.

The net flux transmitted through hole $d$ is much greater for the undistorted or atmospherically compensated case and thus provides a valid measure of image quality.

Figure 2A:
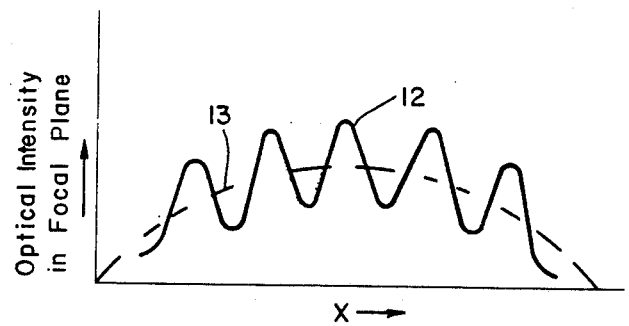
FIGS. 2a and 2b are response curves of the optical intensity distortion in the image plane and the corresponding optical intensity distribution in the optical transform means output showing that improved image quality results in an improved ratio of high to low spatial frequency content at a particular spatial frequency.
Figure 2B:
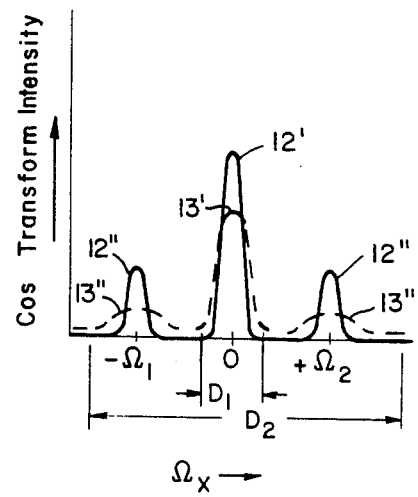

Referring to FIGS. 2a and 2b, the second measure of contrast is the relative high-to-low spatial frequency content in the image. These figures illustrate an image of an object which contains an intensity or reflectivity distribution which is a sinusoidal function of dimensional extent as at 12. Without distortion from atmospheric turbulence or the like, the spatial sinusoidal frequency distribution is retained in the image, whereas with distribution the spatial modulation is effectively reduced to nearly zero, as illustrated by curve 13. The operation of the phase or path length correction system in the present invention is directed so as to substantially restore the undistorted curve 12. Whereas in FIG. 2a the optical intensity is shown as a function of one spatial ordinate X (spatial representation of ordinate Y being the same as X but not shown herein for simplicity), in FIG. 2b the optical intensity is in terms of a cosine transform of the image as a function of spatial frequency $\Omega_x$ ($\Omega_y$ spatial frequency is not shown for simplicity but is similar to $\Omega_x$).

In general it will be recognized that the loss in spatial modulation will be a function of the spatial modulation frequency itself and that there is some loss from the aperture limitations inherent in the telescope even without propagation distortion (shown in FIG. 2c).

Figure 6A:
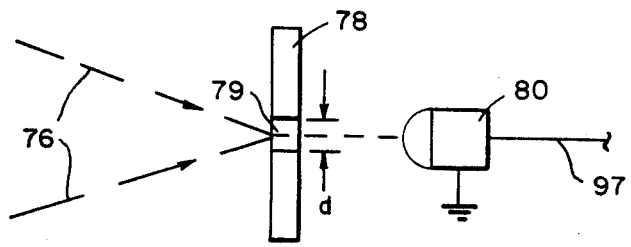
FIGS. 6a and 6b show two different sensor units that may be used in the image quality sensor subsystem in accordance with this invention.
Figure 6B:
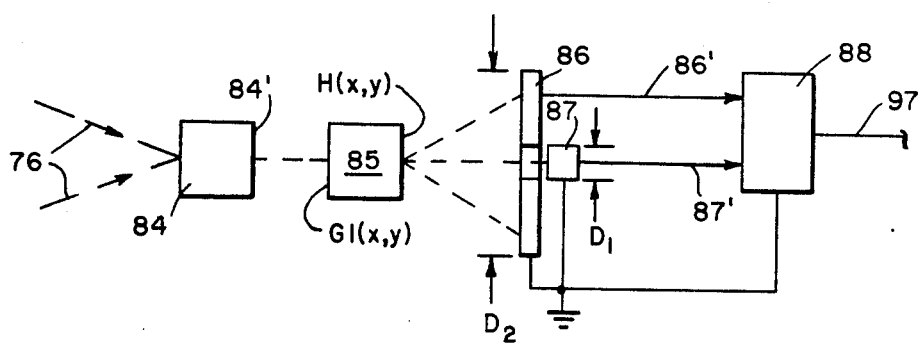
Figure 6C:
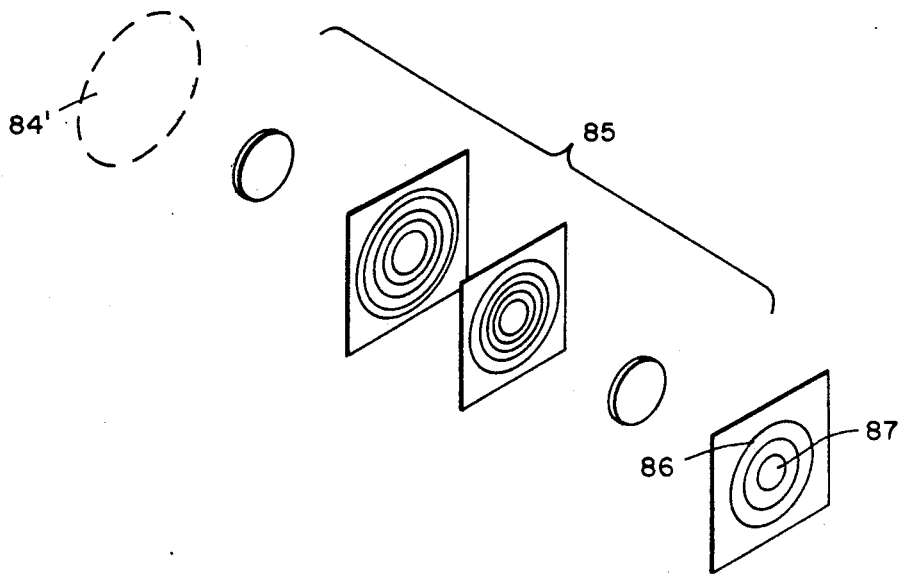
FIG. 6c is a perspective view of the optical portions of the image quality sensor, schematically illustrated in FIG. 6b.

Diameters $D_1$ and $D_2$ of the high and low frequency detectors respectively of image quality sensor 77 as utilized in FIGS. 6b and 6c help to provide the response as in the frequency domain (transform) curve of FIG. 2b. In FIG. 2b it can be seen that the amplitudes of sinusoidal function converted by the Fourier cosine transform or the Hadarmard transform for example as at 12' will be substantially larger in amplitude than the transformed curve with atmospheric distortion as at 13'.

It will be noted that the higher spatial frequencies which contain the essence of the image detail are virtually eliminated by the atmospheric distortion while the lower spatial frequencies are but little affected. Accordingly the ratio of high to low spatial frequency content is an appropriate measure of image quality. Further it is a measure which is independent of the absolute brightness of the source.

Referring to FIGS. 3 and 4, it may be stated that although it has been convenient for discussion purposes to assume rectangular step phase errors and rectangular step phase correcting devices, in fact, it is to be expected that the phase errors are smoothly varying functions, and that it is more efficient in terms of correction quality to introduce corresponding phase error-correcting devices which present a more smoothly varying correction with space than rectangular steps. Thus, for example, with an electro-optical (field dependent) phase shifter, one might employ electrode patches of relatively high conductivity coupled by areas of low conductivity such that the fields and hence the phase shifts vary smoothly from point to point.

Accordingly, FIG. 3 shows the structure comprising a crystal of the KDP type made of $KH_2PO_4$ at 20 with electrically conductive transparent electrodes 18 and 19 at the major surfaces of the crystal. Such electrodes are optically transparent, and the index of refraction of the crystal may be varied in known manner by applying different voltages of either AC or DC type to wires 21, 22, 23 and 24 and ground return, to result in phase delay as a function of discrete step variation as shown in curve 25.

FIG. 4, on the other hand, shows the same KDP type crystal at 30 with only a plurality of electrically conductive transparent electrodes 18 at one surface thereof and a special electrically conductive transparent electrode 31 of non-uniform surface height attached to crystal 30. The peaks of electrode 31 are attached to wires 21, 22, 23 and 24 to enable application of different voltages of either AC or DC between these wires and ground return so as to vary the applied field and hence the phase delay smoothly rather than discretely as in FIG. 3 and thereby obtain response curve as at 35.

The elements of matrix 67 may be those shown in FIG. 3 or in FIG. 4 as herein-above described.

Referring to FIG. 5, ther function of the basic system is to sense a single measure of image quality sharpness and to maximize this measure with respect to each of the voltages applied to the phase correction matrices. As an aid to the maximization process, it is generally helpful for the central system to have the ability to introduce trial path length perturbations, explicitly shown below in connection with analog circuits used as at 100, or by use of digital computer 110 substituted for circuits 100.

Optical beam 60 enters the telescope to be reflected from reflectors 61 as beam 62. Beam 62 is impinged on reflector 63, reflector 63 directing the beam as at 64 through aperture 65 in telescopic reflector 61 to impinge on the elements of the phase shifters discussed in connection with FIGS. 3 or 4 above.

Optical beam as at 68 is propagated through the matrix elements of FIGS. 3 or 4 to impinge upon and be reflected from beam splitter 69 to be split as beam 70 and impinge on lens 71, and to exit lens 71 as beam 72 to impinge as a normal image upon a photographic plate or the like as at 73.

Sensor assembly 77 may be comprised of any of the configurations shown in FIGS. 6a, 6b and 6c.

Sensor assembly 77 is represented in FIG. 6a, by one linear sensor comprising a plate as at 78 with a pinhole 79 therein to pass beam 76 through pinhole 79 and be picked up by optical photodetector as at 80, detector or opto-electric transducer 80 producing an electrical output at 97 constituting an error signal.

Sensor assembly 77 may also be represented by a non-coherent transform detection means shown in FIG. 6b and 6c, as another way of implementation of image quality sensor 77. Here, an image intensifier 84 is provided for intensification of beam 76. The optical output of intensifier 84' provides an input to non-coherent Fourier cosine transform circuit 85 which provides an output optical signal to a high spatial frequency optical defector 86. A low spatial frequency optical detector 87 is also used, generally in coaxial arrangement with outer ring detector 86, so that divider circuit 88 will be responsive to outputs from both low and high frequency optical detectors. Such divider circuit provides error signals as at 97 comprising the ratio of high to low frequency optical components.

High frequency optical detector 86 is comprised of an annular outer ring of material such as CdS and a low frequency optical detector, also of material such as CdS composes an inner ring as at 87, coaxial with ring 85. The outer circumference of rings 86 and 87 are at ground potential, and leads 86' and 87' are respectively connected to rings 86 and 87 for interconnection to divider circuit 88.

Divider circuit 88 can be constructed from an analog multiplier and an operational amplifier as described in Electronic Design News, Feb. 20, 1974, pp. 34–41 or is commercially available, for example as made by Hybrid Systems Inc., Model D125A.

Transform circuit 85 is shown in detail in U.S. Pat. No. 3,700,907 and need not be discussed herein. Intensifier 84 is a conventional optical amplifier known in the art.

Accordingly, error signals may be provided by the several detectors as outputs of image quality sensor 77 at 97 to provide inputs to analog subsystem 100. Subsystem 100 will compute the error signal by synchronously detecting same with low frequency signals fed to perturbation circuits within subsystem 100.

The manner in which the element perturbation subsystem 100 functions need not be discussed with particularity since such subsystem is discussed in detail in U.S. Pat. No. 3,731,103. Briefly, subsystem 100 comprises four different electronic circuits, each circuit being fed by a different frequency, $\omega_1$, $\omega_2$, $\omega_3$ and $\omega_4$ respectively. Each said circuit is responsive to the appropriate frequency wherein said appropriate frequency feeds an operational amplifier 104 and a synchronous detector 105. Output of detector 105 feeds a low pass filter 106. Generally the low pass band is chosen to give a closed loop response ranging between 100 and 1000 Hz. The output of filter 106 also feeds operational amplifier 104. Each of the electronic circuits of subsystem 100 have outputs 21, 22, 23 and 24 from the four operational amplifier which are provided as inputs to the elements of matrix 67, wherein either the discrete step phase shifter of FIG. 3 or the smooth phase shifter of FIG. 4 is actuated by signal outputs from perturbation circuit 100 at wires 21–24. Hence, outputs as at 21–24 will actuate either crystals 20 or 30 to phase modulate the optical signal (passing from telescope output through telescope aperture 65) in order to provide the corrective action and improved image quality.

Referring to FIG. 7, an alternative system utilizing a digital computer as at 110 may be substituted in FIG. 5 for subsystem 100. Inputs to computer 110 constitute the same outputs from image quality sensor 77, and the outputs from computer 110 constitute inputs 21–24 to control phase matrix 67.

In the foregoing schematics, the ground symbol was used to represent the return electrical path, in order to enable simple schematic representation showing single hard wire interconnection between the components of the system.

What is claimed is:

1. In an adaptive imaging telescope for detecting an optical beam received at the aperture of the telescope which provides an optical image at the image plane of said aperture, comprising in combination:

an electro-optic phase shifter, including a planar crystal having two major surfaces and a plurality of electrodes attached to the major surfaces, which phase shifter is positioned substantially at the optical image plane of the aperture of the telescope, responsive to the optical image;

first means, optically coupled to the phase shifter, positioned substantially orthogonally to said optical beam, for converting said beam into an electrical signal which electrical signal is linear in magnitude with respect to the signal of said optical beam; and second means, electrically coupling the first means and the phase shifter, for providing phase modulation of the optical beam.

2. The invention as stated in claim 1:

wherein the first means comprises a plate having a pinhole therein for communicating the optical image therethrough, and a transducer aligned with the pinhole for converting the optical image to an electrical signal; and where in the phase shifter said plurality of electrodes comprises a first plurality of electrodes each being attached to the first major surface of the crystal and a second plurality of electrodes each being attached to the second major surface of the crystal opposite to said first major surface, for providing phase delay of the received optical image in discrete steps.

3. The invention as stated in claim 2, wherein the second means is electrically connected to the electrodes of the phase shifter.

4. The invention as stated in claim 3, including:
an optical beam splitter; and
an optical beam focusing lens, said beam splitter being positioned in line with optical image and angularly positioned with respect to the phase shifter and the focusing lens, said beam splitter and focusing lens being both positioned intermediate the phase shifter and the second means.

5. The invention as stated in claim 4, including:
another lens responsive to light reflected from the beam splitter; and
means for photographing the received image by virtue of the light communicated through said another lens.

6. The invention as stated in claim 1:
wherein the first means comprises a plate having a pinhole therein for communicating a portion of the optical image therethrough, and a transducer aligned with the pinhole for converting the optical image to an electrical signal; and where in the phase shifter said plurality of electrodes comprises a first plurality of electrodes attached to the first major surface of the crystal, and an electrode of non-uniform surface height attached to the second major surface of the crystal opposite to said first major surface, for providing smoothly varying phase delay of the received optical image.

7. The invention as stated in claim 6, wherein the second means is electrically connected to the electrodes of the phase shifter.

8. The invention as stated in claim 7, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and the second means.

9. The invention as stated in claim 8, including:
another lens responsive to light reflected from the beam splitter; and
means for photographing the received image by virtue of the light communicated through said another lens.

10. The invention as stated in claim 1, wherein:
the first means is a non-coherent detection means comprising:
non-coherent transform means responsive to the optical image;
a high frequency optical detector optically coupled to the transform means;
a low frequency optical detector optically coupled to the transform means;
a divider electrically connected to the high and low frequency detectors; and
where in the phase shifter said plurality of electrodes comprises a first plurality of electrodes attached to the first major surface of the crystal, and a second plurality of electrodes attached to the second major surface of the crystal opposite to said one major surface, for providing phase delay of the received optical image in discrete steps.

11. The invention as stated in claim 10, wherein the second means is electrically connected to the electrodes of the phase shifter.

12. The invention as stated in claim 11, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and the second means.

13. The invention as stated in claim 12, including:
another lens responsive to light reflected from the beam splitter; and
means for photographing the received image by virtue of the light communicated through said another lens.

14. The invention as stated in claim 1, wherein: the first means is a non-coherent detection means, comprising:
a non-coherent transform means responsive to the optical image;
a high frequency optical detector, optically coupled to the transform means;
a low frequency optical detector optically coupled to the transformer means;

a divider, electrically coupled to the high and low frequency detector; and wherein the phase shifter said plurality of electrodes comprises a first plurality of electrodes attached to the first major surface of the crystal, and an electrode of non-uniform surface height attached to the second major surface of the crystal opposite to said first major surface, for providing smoothly varying phase delay of the received optical image.

15. The invention as stated in claim 14, wherein the second means is electrically connected to the electrodes of the phase shifter.

16. The invention as stated in claim 15, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and the second means.

17. The invention as stated in claim 16, including:
another lens responsive to light reflected from the beam splitter; and
means for photographing the received image by virtue of the light communicated through said another lens.

\* \* \* \* \*

UNITED STATES PATENT OFFICE
CERTIFICATE OF CORRECTION

PATENT NO. : 3,975,629

DATED : August 17, 1976

INVENTOR(S) : THOMAS R. O'MEARA

It is certified that error appears in the above-identified patent and that said Letters Patent are hereby corrected as shown below:

| COLUMN | LINE | DELETE | SUBSTITUTE |
|---|---|---|---|
| 1 | 40 | sptially | spatially |
| 1 | 56 | conseqeunce | consequence |
| 6 | 13 | defector | detector |

Column 7, lines 13-16 should read:

1. An adaptive imaging telescope for detecting an optical beam received at the aperture of the telescope which provides an optical image at the image plane of said aperture comprising in combination:

| CLAIM | COLUMN | LINE | DELETE | SUBSTITUTE |
|---|---|---|---|---|
| 6 | 8 | 3 | alec- | elec- |

Signed and Sealed this

Eighteenth Day of January 1977

[SEAL]

Attest:

RUTH C. MASON
*Attesting Officer*

C. MARSHALL DANN
*Commissioner of Patents and Trademarks*